US008411736B2

(12) United States Patent
Henocq et al.

(10) Patent No.: US 8,411,736 B2
(45) Date of Patent: Apr. 2, 2013

(54) METHOD AND DEVICE FOR PROCESSING A HIERARCHICAL MULTIMEDIA DATA STREAM TRANSMITTED OVER A NETWORK WITH LOSS

(75) Inventors: Xavier Henocq, Melesse (FR); Naël Ouedraogo, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 1101 days.

(21) Appl. No.: 12/324,553

(22) Filed: Nov. 26, 2008

(65) Prior Publication Data

US 2009/0138773 A1      May 28, 2009

(30) Foreign Application Priority Data

Nov. 28, 2007  (FR) ..................................... 07 59386

(51) Int. Cl.
*H04N 7/12* (2006.01)
(52) U.S. Cl. ............................. 375/240.01; 375/240.27
(58) Field of Classification Search .................. 375/240, 375/240.01, 240.02, 240.08, 240.25, 240.27; 386/264
See application file for complete search history.

(56) References Cited

U.S. PATENT DOCUMENTS

| | | | | |
|---|---|---|---|---|
| 6,961,383 B1 * | 11/2005 | Reibman et al. | ......... | 375/240.25 |
| 6,999,673 B1 * | 2/2006 | Kadono | .......................... | 386/264 |
| 2003/0048845 A1 * | 3/2003 | Le Maguet | ............... | 375/240.08 |

FOREIGN PATENT DOCUMENTS

EP    1 809 041    7/2007

OTHER PUBLICATIONS

U.S. Appl. No. 12/400,745, filed Mar. 9, 2009; Inventors: Xavier Henocq, Patrice Onno, and Fabrice Le Leannec.
Ghandi, et al., "Error concealment for SNR scalable video coding", Signal Processing: Image Communication, vol. 21, pp. 91-99 (2006).
ChenYing, et al., "Frame loss error concealment for SVC", Journal of Zhejiang University Science A, vol. 7, No. 5, pp. 677-683 (2006).
Yao Wang, et al., "Real-Time Video Communications over Unreliable Networks", IEEE Signal Processing Magazine, vol. 17, No. 4, pp. 61-82 (Jul. 2000).
Yao Wang, et al., "Error Control and Concealment for Video Communication: A Review", Proceedings of the IEEE, vol. 86, No. 5, pp. 974-997 (1998).
French Search Report dated Sep. 17, 2008 in French Patent Application No. 0759386.M. Stoufs, et al., "Error Concealment for the Scalable Extension of H.264/MPEG-4 AVC", Interdisciplinary Institute for Broadband Technology, Nov. 2007, Brussels, Belgium (XP-002496234).

* cited by examiner

*Primary Examiner* — Allen Wong
(74) *Attorney, Agent, or Firm* — Fitzpatrick, Cella, Harper & Scinto

(57) ABSTRACT

The invention relates to a method of processing a multimedia data stream coded according to a plurality of hierarchical levels and transmitted over a communication network with loss, the hierarchy levels being ordered so that a so-called higher hierarchy level is coded in a way that is dependent on at least one so-called lower hierarchy level, at least one portion of multimedia data of a lower hierarchy level having suffered losses, the method comprising a step (515) of error concealment in said at least one portion of data having suffered losses, characterized in that it comprises a processing step applied to the error concealment in said at least one portion of data of the lower hierarchy level and involving data of at least one higher hierarchy level dependent on the lower hierarchy level.

18 Claims, 8 Drawing Sheets

METHOD AND DEVICE FOR PROCESSING A HIERARCHICAL MULTIMEDIA DATA STREAM TRANSMITTED OVER A NETWORK WITH LOSS

The invention relates to the processing of a hierarchical multimedia data stream transmitted over a communication network with loss and applies in particular to a hierarchical video stream.

Hierarchical stream means a digital stream where the binary data is organized in several hierarchical levels.

The hierarchical or "scalable" levels are ordered so that a so-called higher hierarchy level depends, for its prediction, on one or more so called lower hierarchy levels.

The invention applies in particular to the case of the SVC (Scalable Video Coding) system, for which a standard is currently being produced.

The future video compression standard known as SVC makes provision for providing a hierarchical or scalable video representation, that is to say with different levels evaluated according to three criteria or dimensions: the signal to noise ratio, known as SNR, which defines the quality of the coding pixel by pixel, the temporal resolution, that is to say the number of images per second represented by the coded data, and the spatial resolution, that is to say the number of pixels represented by the coded data.

The SVC standard is being developed by the JVT (Joint Video Team) group, which brings together the experts in video compression from the MPEG group of the ISO/IEC committee and the video experts of the ITU. This new standard takes as its basis the compression techniques of the MPEG-4-AVC standard, also referred to as H.264. The technological advances in SVC concern mainly the scalability of the video format. This is because this new video format can be decoded differently according to the possibilities of the decoder and the characteristics of the network. For example, from a high-resolution video (type SD, 704×576, 60 Hz), it will be possible to code in a single bit stream, using two "layers", the compressed data of the SD sequence and those of a sequence to the CIF format (352×288, 60 Hz). In order to decode the CIF resolution, the decoder will decode only some of the information coded in the bit stream. Conversely, it will have to decode all the bit stream in order to restore the SD version.

This example illustrates the spatial scalability functionality, that is to say the possibility, from a single stream, of extracting videos where the size of the images is different.

The SVC video compression system provides scalabilities in the temporal and spatial dimensions and SNR (in terms of quality). Temporal scalability is obtained via the B images.

SNR scalability exists in two forms: fine SNR scalability, denoted FGS, is obtained by progressive quantization of the images. Coarse SNR scalability or CGS is supplied by the coding of a layer in which a temporal decomposition is carried out independently of the lower layer, and which is predicted from the directly lower layer.

Finally, spatial scalability is obtained by predictive coding of a layer in which a temporal decomposition is carried out independently of the lower layer. The coding of a spatial refinement layer is similar to that of a CGS layer, except that it serves to compress the video sequence at a higher resolution level compared with the lower layer. It includes in particular a spatial oversampling step in the two spatial dimensions (width and height) in the interlayer prediction process.

When a hierarchical video stream is transmitted over an unreliable network, data losses are liable to occur in the images in the stream.

Thus one or more images in a lower hierarchy level of the stream may be affected by losses that are liable to result, in certain cases, in a complete image loss.

The article entitled "Frame loss error concealment for SVC" by Chen and al/J Zhejiang Univ SCIENCE A, Zhejiang University Press, published in collaboration with Springer-Verlag GmbH, volume 7, number 5/May 2006 proposes algorithms for masking errors in a hierarchical content composed of several interdependent hierarchical levels or layers.

More particularly, two error masking methods are proposed in this article:
  a first method envisages, in order to carry out the error concealment, using the information that is available in the hierarchical layer that has suffered the loss of information and one speaks of intra-layer error concealment;
  a second method envisages, in order to carry out the error concealment, using the information available in a lower hierarchical layer for correcting the information lost in the higher hierarchical layer and then one speaks of inter-layer error concealment.

Such error concealment methods developed at the present time in the context of simple-definition video stream transmission (for example the definition used for television) have proved satisfactory with respect to the quality requirements relating to simple definition.

However, at the present time, the video streams to be transmitted relate more and more to applications where the video is in high definition, such as for example for high-definition television.

The requirements in terms of quality are therefore higher and the error concealment methods of the prior art are not suited to this change.

More generally, this requirement exists also for multimedia data streams (video, audio etc) to be transmitted over a network with loss.

Thus the object of the present invention is a method of processing a multimedia data stream coded according to a plurality of hierarchical levels and transmitted over a communication network with loss, the hierarchy levels being order so that a so-called higher hierarchy level is coded in a way that is dependent on at least one so-called lower hierarchy level, at least one portion of multimedia data of a lower hierarchy level having suffered losses, the method comprising a step of error concealment in said at least one portion of data that has suffered losses, characterized in that it comprises a processing step applied to the error concealment in said at least one portion of data of the lower hierarchy level and involving data of at least one higher hierarchy level dependent on the lower hierarchy level.

The invention makes it possible to use data coming from one of the higher hierarchy levels or several of them in an error concealment procedure used for correcting errors occurring in one or more portions of data of a lower hierarchical level.

Thus use is made of this data available in the transmitted stream and which, according to the prior art, is not used for reconstituting missing data in a lower hierarchic level. Moreover, the data of the higher levels is sometimes not even used at all since the base level is affected by errors.

It should be noted that the data thus used is reliable data, that is to say it does not depend on corrupted data (lost or erroneous) for its interpretation.

In general terms, the use of this data of higher hierarchic levels improves the error concealment quality applied to the hierarchical stream in question, this stream may comprise video data, audio data etc.

It should be noted that the hierarchical levels in question are not necessarily immediately successive. For example, if the base level and the higher levels 1 and 2 of a hierarchical stream are considered, the data of level 2 may be used in relation to the error concealment of data lost in the base level.

In addition, data of several higher levels may serve for concealing errors in a lower level.

More particularly, the multimedia data stream is a video stream and the portions of data of the ordered hierarchy levels are images.

According to a first embodiment, the processing step consists of using data of said at least one higher hierarchy level for concealment of the errors in said at least one portion of data of the lower hierarchy level.

Thus data absent from the lower level may be obtained from the higher level.

Error concealment proves more effective than previously since the data of higher level or levels is more precise than that of lower level or levels and therefore contributes to a higher error concealment quality.

In the case of a video stream, image data is used for reconstituting missing image data.

According to a characteristic relating to the video stream, the lost data of the image comprising a block of data bMb, the method comprises a step of seeking the associated block or blocks of data eMb in the corresponding image of a higher level.

This makes it possible to better identify all the data that may serve for the error concealment of the erroneous block.

According to a characteristic dependent on the previous one, the method comprises a verification step in order to check whether the coding modes for the block or blocks eMb supply sufficient data for carrying out the error concealment of the block bMb.

The purpose of this check is to avoid beginning an error concealment of the block with unnecessary data.

According to a characteristic dependent on the previous one, the method comprises a step of error concealment of the block bMb according to the results of the decoding of the block or blocks eMb.

This makes it possible to increase the quality of the error concealment compared with an error concealment where the blocks eMb are not taken into account.

According to a second embodiment, the processing step consists of using data of the said at least one higher hierarchy level for verifying the efficacy of the error concealment step performed in said at least one portion of data of the lower hierarchy level.

Thus, by virtue of the data of the higher level or levels, the efficacy (in terms of quality) of various error concealment techniques can be tested, which makes it possible to select the most effective among them.

It should be noted that the quality is assessed by comparing an original image and an error concealed image (the image reconstituted by error concealment).

It should also be noted that it can also be envisaged, according to this second embodiment, verifying the efficacy of the error concealment technique used in the first embodiment.

In this second embodiment, in the case of a video stream, descriptive data is used rather than image data as in the first embodiment.

Thus one or more motion quantity vectors of a higher level are used.

According to one characteristic, the processing step comprises the use of the data of said at least one higher hierarchy level for verifying the efficacy of the error concealment step performed in said at least one portion of data of the lower hierarchy level.

Because of this, the risk related to unsuitable error concealment is reduced.

According to one characteristic, the method comprises a step of selecting an error concealment method between a temporal error concealment and a spatial error concealment, the selection being carried out according to the data of a higher hierarchical level or levels available and a predetermined criterion.

Thus, if several error concealment methods are available, the most effective will be selected.

According to one characteristic, the method comprises a step of determining the consistency of an error concealment method with the data of a higher hierarchical level or levels available.

This makes it possible to select the most effective error concealment method among several.

According to one characteristic, the lost data of the image comprising a block bMb, the method comprises the following steps:

determining the consistency between one or more estimated motion vectors of the lost data block bMb and one or more motion vectors of the associated block or blocks in the corresponding image of higher level, and according to the results of the determination, selecting an error concealment method between a temporal error concealment and a spatial error concealment.

The pertinence of the temporal error concealment can thus be determined. If inconsistency is found, spatial error concealment is used by default.

According to one characteristic, the method comprises the following steps:

spatial error concealment and temporal error concealment of the blocks of lost data in the lower-level image and then reconstitution of two higher-level images from the two lower-level images obtained by the respective error concealments, respective spatial error concealment and temporal error concealment of the blocks of lost data in the corresponding higher-level image, comparison between each higher-level image reconstituted and each higher-level image obtained by respective error concealments, selection of a error concealment method according to the comparison.

The above method amounts to deciding that, if the temporal error concealment gives inconsistent results, spatial error concealment will give better results, which is however not always the case. The above method makes provision for comparing the results supplied by error concealment methods with respect to one another and selecting the most effective.

According to one characteristic, the determination of consistency is carried out between the method of error concealment of a block of lost data in the lower-level image and the method of coding the associated data block or blocks in the corresponding higher-level image.

This determination therefore does not require the complete decoding of the higher-level block or blocks.

According to a characteristic dependent on the previous one, in the event of consistency, the method comprises a step of comparing the method of coding the received blocks adjoining the lost block with the method of coding the associated block or blocks of data in the corresponding higher-level image.

This makes it possible to ensure that the consistency criterion is valid. This is because, if there is no consistency between the adjoining blocks received and the associated higher-level blocks of data, there is little chance for the lost block to be consistent with the associated blocks.

According to one characteristic, the method comprises a step of determining consistency between the pixels of the block obtained by error concealment according to the error concealment method in question and the adjoining pixels.

According to one characteristic, the method comprises a step of determining an efficacy coefficient for each of the error concealment methods among a plurality of error concealment methods according to the data of higher hierarchical level or levels available.

This determination makes it possible to compare the different methods with each other.

Another object of the invention is a device for processing a multimedia data stream coded according to a plurality of hierarchical levels and transmitted over a communication network with loss, the hierarchy levels being ordered so that a so-called higher hierarchy level is coded in a way that is dependent on at least one so-called lower hierarchy level, at least one portion of multimedia data of a lower hierarchy level having suffered losses, the device comprising means of error concealment in said at least one portion of data having suffered losses, characterized in that it comprises processing means applied to the error concealment in said at least one portion of data of the lower hierarchy level and involving data of at least one higher hierarchy level dependent on the lower hierarchy level.

According to one characteristic, the multimedia stream is a video stream and the portions of data of the ordered hierarchy levels are images.

According to a first embodiment, the processing means are able to use data of said at least one higher hierarchy level for concealing errors in said at least one portion of data of the lower hierarchy level.

According to a second embodiment, the processing means are able to use data of said at least one higher hierarchy level for verifying the efficacy of the error concealment performed in said at least one portion of data of the lower hierarchy level.

The invention also concerns an information storage means that can be read by a computer or a microprocessor, containing code instructions of a computer program for executing the steps of the method according to the invention such as the one briefly disclosed above.

The invention also relates to a partially or totally removable information storage means, able to be read by a computer or a microprocessor, containing code instructions of a computer program for executing the steps of the method according to the invention such as the one briefly disclosed above.

According to yet another aspect, the invention relates to a computer program that can be loaded into a programmable apparatus, containing sequences of instructions or portions of software code for implementing steps of the method according to the invention as briefly disclosed above, when said computer program is loaded into and executed on the programmable apparatus.

The characteristics and advantages relating to the device according to the invention, to the information storage means and to the computer program being the same as those disclosed above concerning the method according to the invention, they will not be repeated here.

Other characteristics and advantages will emerge during the following description, given solely by way of non-limiting examples and made with reference to the accompanying drawings, in which.

The present invention is concerned with the processing of a data stream or multimedia bit stream coded according to a plurality of hierarchical levels.

The different hierarchical levels of the stream are ordered so that a hierarchy level called the higher level is coded so as to be dependent on one or more hierarchical levels called lower levels.

The stream is for example organized in data packets.

In the context of the invention, such a stream is transmitted over a communication network (not shown) with loss.

Figure 1:
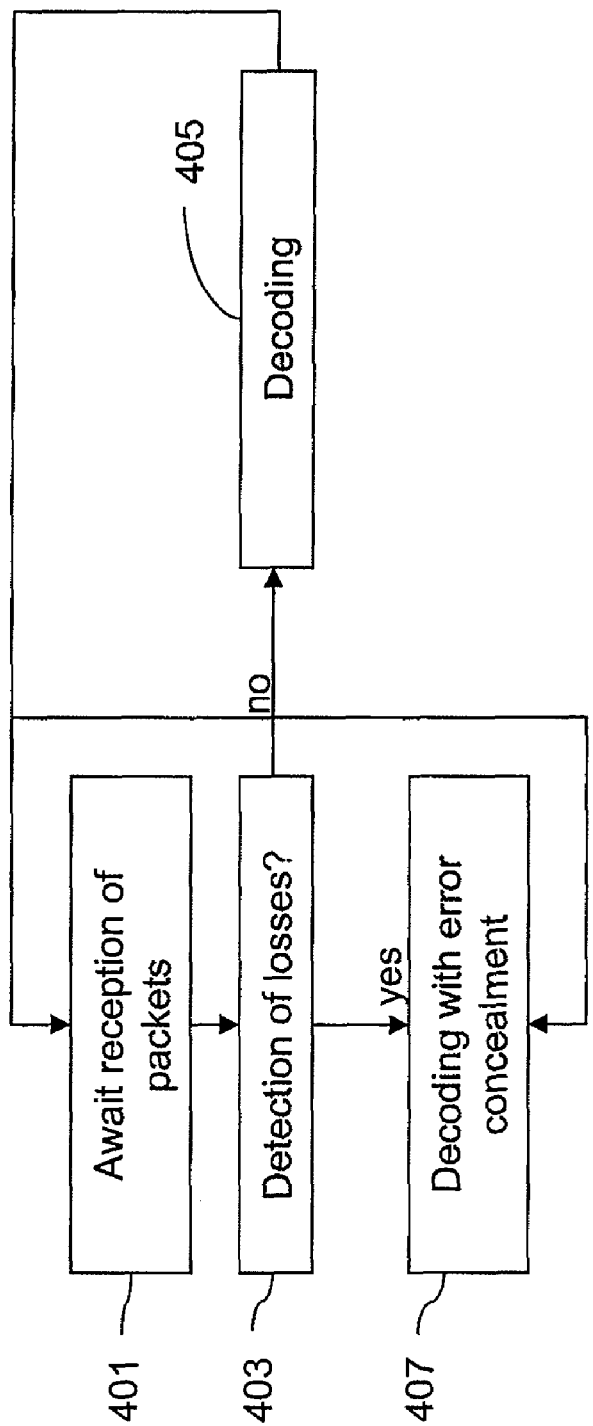
FIG. 1 depicts schematically the processing of a stream of coded data.

FIG. 1 illustrates schematically the processing of such a multimedia data stream transmitted over a network with loss.

The algorithm depicted in FIG. 1 is implemented in a system for receiving and decoding coded streams transmitted for example by a distant server (client server architecture).

It should be noted that the various hierarchical levels or scalability layers are for example transmitted over different network sessions so that the packet losses caused by overloading the network are not correlated.

The algorithm in FIG. 1 comprises a first step 401 during which the various data packets constituting the stream are stored in buffers.

This temporary storage is very useful in order to take account of the fact that the transmission time over the communication network may vary from one packet to another.

The time delay is thus there to enable the greatest number of packets to be collected together at the same point before being decoded.

When the time-delay phase ends, a second step 403 of the algorithm is executed in order to detect, in a known fashion, whether the data losses occurred during transmission over the network.

Such a known loss detection system uses for example the sequence number of the packets and the temporal indicator representing the appearance of the data in the video sequence (known by the term "timestamp").

During this step, the zone or zones of the stream that have been corrupted (data losses or erroneous data) and thus are therefore unusable are identified.

When, for a set of packets that are to be decoded together, no loss of packets has been detected, then the following step 405 of the algorithm is executed.

During this step, a conventional decoder proceeds with the decoding of all the data packets in a known manner.

The algorithm next makes provision for repositioning itself at step 401 in order to await reception of new packets.

On the other hand, if for the whole of the group of packets in question, losses have been detected in a lower hierarchy level of the stream, then the algorithm provides for the execution of a following step 407.

During this step, a decoding with error concealment of the coded data is in particular proceeded with, the error concealment being there in order to reconstitute the missing or corrupted data in whole or in part.

It should be noted that, for execution of this step, data of the hierarchy level or levels higher than that where the losses occurred (the lower hierarchy level) are necessary.

The data is used in relation to the error concealment in order to improve the efficacy thereof.

To do this, it may be therefore be useful to wait to receive more packets than the number conventionally adopted for proceeding with decoding.

In the remainder of the description, it is considered that the multimedia stream is a video stream and that the portions of data of the ordered hierarchical levels that have suffered losses are images.

The invention will be described in its application to SVC hierarchical video coding.

However, other types of hierarchical video coding can be envisaged: H263+ and Part 2 of MPEG-4.

It should however be noted that the invention also applies to an audio data stream using a hierarchical coding.

Two embodiments of the invention can be envisaged in order to improve the efficacy (in terms of quality) of the error concealment while taking advantage of data of dependent hierarchical level or levels which, normally, are not used.

This data, even if it has been correctly received, is not used in the prior art since it forms part of enhancement layers of a base layer which is itself affected by errors.

According to a first embodiment, data of one or more higher hierarchical levels of the video stream received is used in order to conceal the errors in one or more images of the lower hierarchy level.

According to a second embodiment that will be described subsequently (in particular with reference to FIGS. 4 to 7), data coming from higher hierarchical level or levels of the stream received is used to evaluate the efficacy of a given error concealment method or methods.

Figure 2:
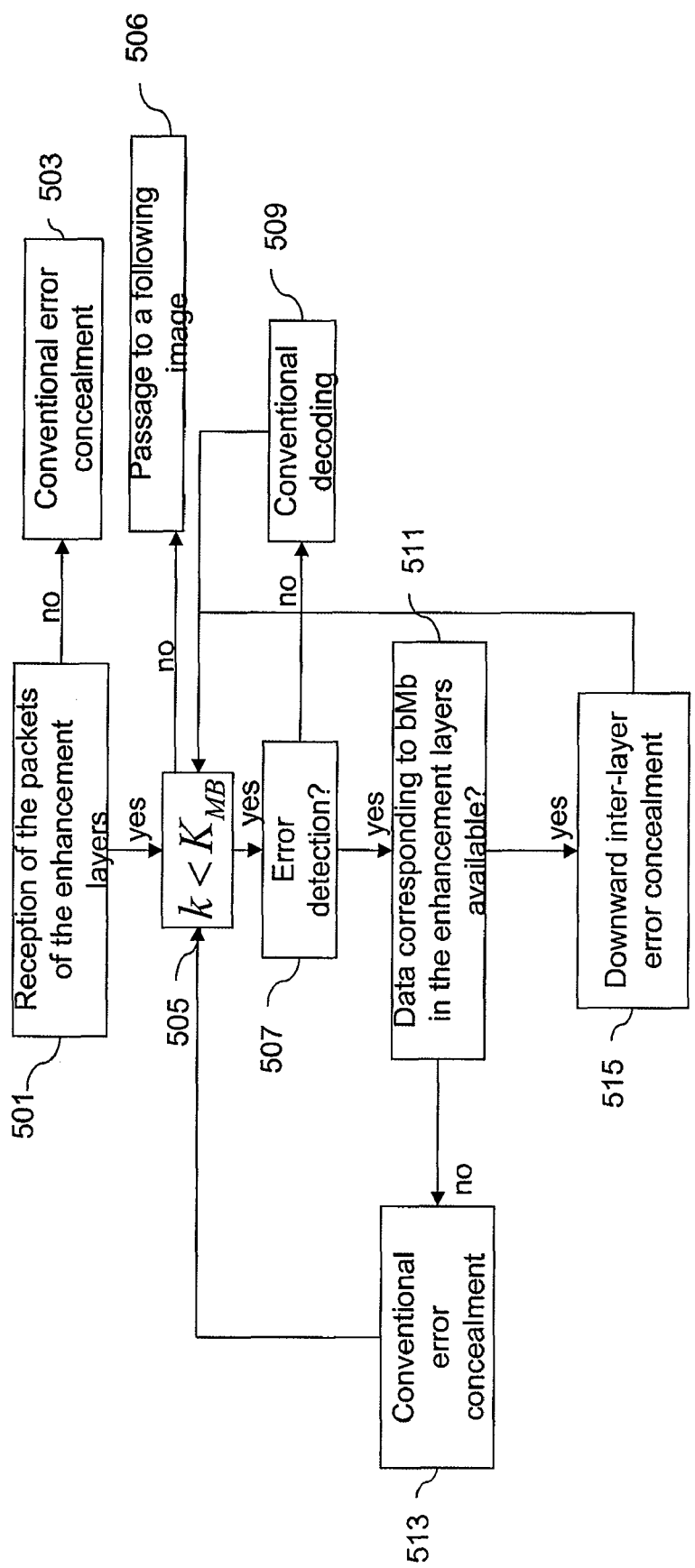
FIG. 2 is an algorithm illustrating a first embodiment of the method according to the invention.

FIG. 2 depicts an algorithm illustrating the implementation of the first embodiment of the invention.

This algorithm begins with a first step 501 during which the availability of data of the higher hierarchical levels (enhancement layers) is checked.

Where none of this data is available then the following step 503 is executed.

During this step, a conventional error concealment in the image or images of the lower hierarchical level is carried out.

It should be noted that the image that suffered the losses is not necessarily an image in the base layer.

On the contrary, should data of the higher hierarchical levels have been received by the decoding device, then the algorithm makes provision for processing all the macroblocks of the image of the lower hierarchical level that suffered losses at the steps that will be described below.

It should be noted that a macroblock is a block of data of images of a defined size in the standard, for example SVC.

The processing of the macroblocks of the image begins with step 505, during which a test is performed in order to determine whether all the macroblocks of the image have been processed.

If such is the case, then the following step 506 is executed and the following image is processed.

For each macroblock of the image of the lower hierarchy level, denoted bMb, the following step 507 makes provision for detecting, in a known fashion, whether losses or errors have occurred.

When no loss is detected for this macroblock, then it is decoded in a known fashion at the following step 509.

On the other hand, when an error detection takes place at step 507, this means that the macroblock bMb has suffered losses partly or that it has been completely lost.

In this case, the following step 511 of the algorithm makes provision for seeking, in the corresponding image of the higher hierarchy level or levels available in the device (enhancement layers) the associated macroblock or macroblocks.

In this way the information in relation to the corrupted data of the lower level is identified in the higher level or levels of the hierarchical stream.

With regard to temporal scalability and so-called SNR scalability, the macroblock located at the same spatial coordinates as the lost macroblock bMb is sought.

With regard to spatial scalability, the search for the associated blocks of data is carried out by associating each block of data of size 8×8 of the macroblock bMb with a macroblock of the corresponding image in the higher hierarchical level. This macroblock is situated at the spatial coordinates dependent on the spatial ratio between the hierarchical levels.

Thus, for example, when the spatial ratio between the two hierarchical levels is 2, each block of size 8×8 of the macroblock bMb of the lower level is associated with the macroblock situated at double its coordinates in the image of the higher level.

If enhanced spatial scalability (known by the acronym ESS) is considered, each block of the lost macroblock bMb can correspond to part of a block or a macroblock of a higher level. This is because, when the ratio between the two levels (resolutions) is not an integer number, the correspondence between the blocks is not easy to determine. In this case, the reference search algorithm that is used for encoding for ESS is applied.

When the data associated with the lost data block bMb is not available in the higher hierarchical level or levels, then step 511 is followed by step 513, which makes provision for carrying out a conventional error concealment.

On the other hand, if the data of a higher hierarchical level or levels is available, then the following step 515 is passed to. This step makes provision for using the data of the corresponding macroblock of the corresponding image in the higher level in order to conceal the errors related to the macroblock bMb.

This error concealment will be detailed with reference to the following figures.

For reasons of simplification, in the remainder of the disclosure only one block will be used (eg: macroblock) of a single higher hierarchical level in order to proceed with the error concealment in the lower level.

However, the invention also applies to the case where several blocks (eg: macroblocks) issuing from one and the same higher hierarchical level or several blocks (eg: macroblocks) issuing from different higher hierarchical levels can be used to carry out the error concealment in a lower level.

By way of example, if a data stream comprises two spatial hierarchy levels and each of these levels has two temporal hierarchy levels, then a lost macroblock of the lowest hierarchical level can be concealed by involving three macroblocks issuing from each of the higher hierarchical levels.

Figure 3:
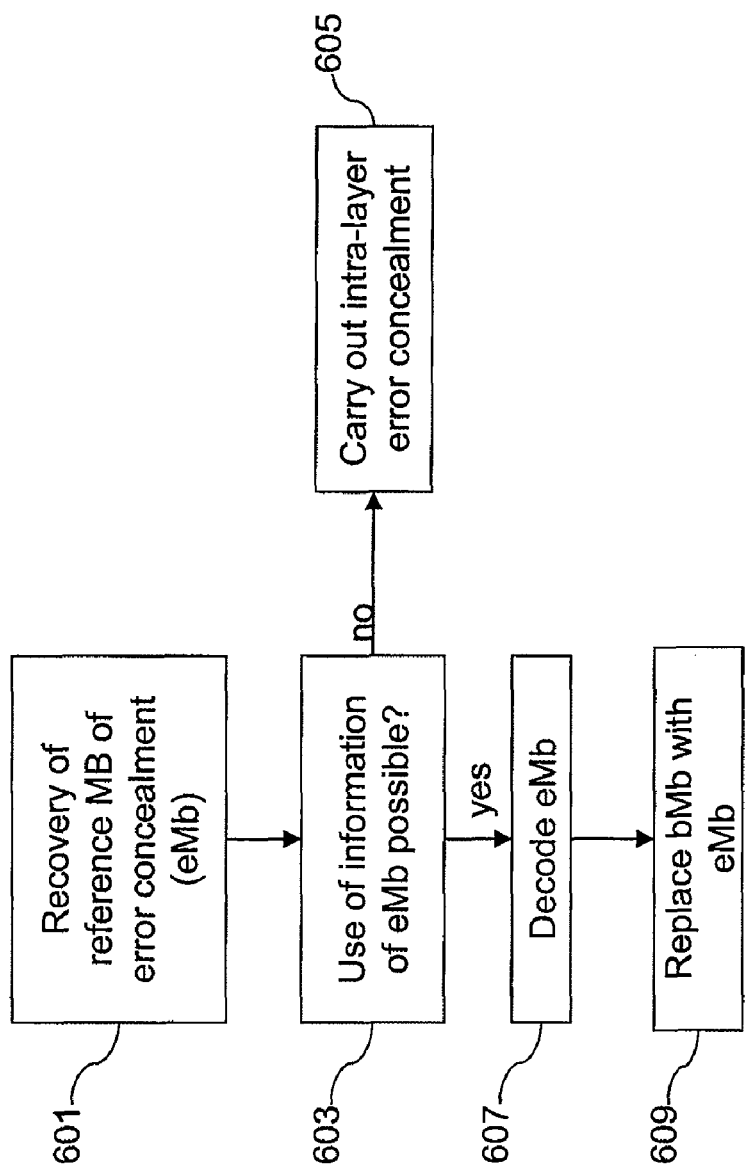
FIG. 3 is an algorithm detailing step 515 of FIG. 2.

The algorithm of FIG. 3 illustrates a possibility of implementation of the error concealment according to the invention as described by steps 511, 513, 515 in FIG. 2.

In this algorithm use is made of the coding modes and the prediction elements of the macroblock eMb of the higher level (enhancement level) in order to conceal the errors present in an image of the lower level (base layer).

The algorithm begins with a first step 601 of identifying the macroblock eMb of the corresponding image of the higher hierarchical level and which corresponds to the lost macroblock bMb of the lower hierarchical level.

It should be noted that, in certain scalability cases (for example enhanced spatial scalability or ESS), several macroblocks of higher levels will be taken into account in order to carry out the concealment of a lost macroblock in a lower level.

Step 601 is followed by a verification step 603.

During this step it is checked whether the information associated with the macroblock eMb of the higher level are sufficient to carry out the error concealment in question.

More particularly, it is checked whether the coding modes of the macroblock eMb supply sufficient quality of additional data to carry out effective error concealment.

This step depends on the scalability mode in question.

For example, when it is a question of temporal scalability, the block eMb generally belongs to a past bidirectional image or respectively to a future bidirectional image which may have the image affected by errors as its reference.

If the block eMb is predicted from the lost macroblock, that is to say its coding mode is said to be backward (or respectively if the coding mode is said to be forward), or if the coding mode is bidirectional, then the data of the macroblock eMb will not be usable.

In the same way, for so-called SNR and spatial scalabilities, some macroblocks will not be decodable because of a certain dependency between the hierarchical levels.

Should the information relating to the macroblock eMb be insufficient, that is to say the coding mode for this macroblock does not make it possible to estimate lost data of the macroblock bMb, then a conventional intra-level error concealment is carried out during the following step 605.

On the other hand, when the information relating to the macroblock eMb is sufficient, then the following step 607 performs the decoding of the macroblock eMb.

During the following step 609, the error concealment of the block bMb is carried out according to the result of the decoding of the block eMb, replacing the block bMb with this result.

Figure 4:
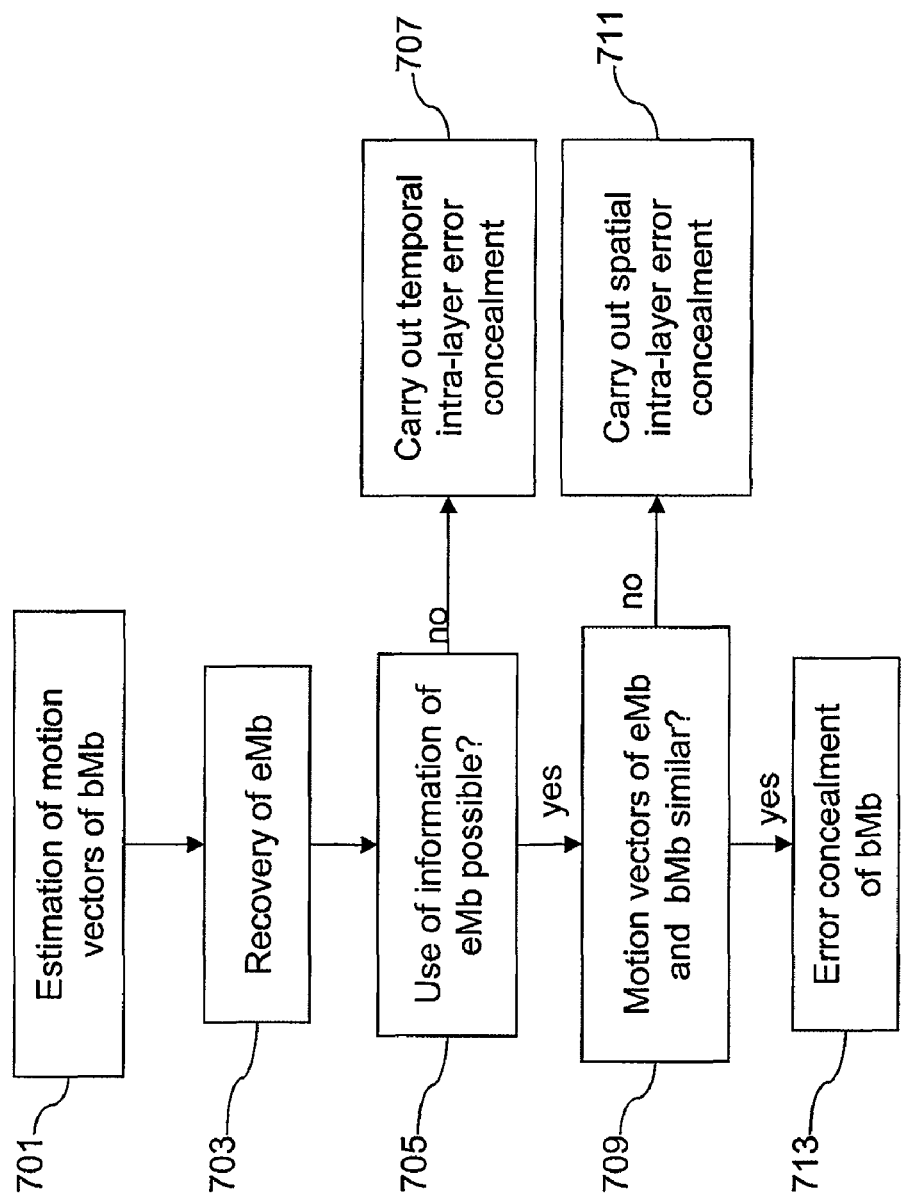
FIG. 4 is an algorithm detailing steps 511, 513 and 515 of FIG. 2 according to a variant embodiment.

FIG. 4 shows an algorithm illustrating a variant embodiment of the descending inter-level error concealment steps 511, 513 and 515 of FIG. 2.

This algorithm makes it possible to evaluate the quality of error concealment and, according to the data of a higher hierarchical level or levels available, to make a selection of error concealment methods between for example a temporal error concealment and a spatial error concealment.

This selection is also made according to a predetermined criterion that will be detailed during the description of this algorithm.

The algorithm begins with a step 701 of estimating the motion vectors of the lost or erroneous macroblock bMb. To do this, the motion vectors of the macroblocks adjoining the macroblock bMb are used and an estimation of motion vectors of the macroblock bMb is generated by extrapolation from the motion vectors of the adjoining macroblocks.

During the following step 703, just like step 601 in FIG. 3, provision is made for recovering the macroblock eMb of the higher level and which corresponds to the lost or erroneous macroblock bMb.

During the following step 705, it is checked whether the data associated with the macroblock eMb is of sufficient quality to evaluate the quality of the temporal error concealment of the macroblock in question.

This is because, if this macroblock is itself erroneous, it will not be usable.

This may be the case if the macroblock depends on a lost macroblock in a lower level.

It should be noted that a temporal error concealment uses coding data for the current and previous available images and images which supply information on the temporal changes in the pixels of an image.

The motion vectors of the macroblocks of an image are for example used as information representing the temporal changes in the pixels.

It should be noted that, as soon as the bit stream corresponding to the block eMb is available or sufficiently reconstitutable, this macroblock is usable.

When it is a question of temporal scalability, all the macroblocks whose bit stream has been received can be used.

However, this property is not valid for the macroblocks of a spatial or SNR hierarchical level.

This is explained by the fact that, in certain compression modes of the SVC standard, a majority of the data of a macroblock of a higher level which is interesting for proceeding with a descending inter-level error concealment (motion vector, coding mode, macroblock partitioning, etc) can be reconstituted only if the macroblock bMb is available, which is not the case here.

The unusable macroblocks are indicated in the bit stream of the higher hierarchical level by the presence of specific identification information such as "base_mode_flag" and "base_mode_refinement_flag".

Thus, when one of these items of information is detected in the bit steam received by the device, it will not be possible to evaluate the quality of the temporal error concealment from the data recovered from the higher level (enhancement layers).

In such cases, step 705 is followed by step 707, which performs a conventional temporal intra-level error concealment to conceal the block bMb of lost or erroneous data in the lower-level image.

If on the other hand the information associated with the macroblock eMb of the higher hierarchical level is sufficient in terms of quality to evaluate the quality of the temporal error concealment, then the following step 709 is passed to. During this step, the consistency between the motion vectors of the high level related to the macroblock eMb and the motion vectors of the lower level related to the macroblock bMb is determined.

In practice, a comparison is made between these motion vectors in order to check whether they are co-linear or substantially co-linear or on the contrary inconsistent with each other.

This step involves, as a criterion for selecting a error concealment method, the similarity between the motion vectors of the matching data blocks in the hierarchical levels in question.

It should be noted that, during step 709, step 607 is simulated without however carrying out complete decoding.

It is possible to evaluate the similarity of the motion vectors by taking into account the value of the angle alpha that the motion vectors of the macroblocks bMb and eMb make between them.

Where the angle alpha is greater than a predetermined threshold value delta, it is considered that the motion vectors are inconsistent with each other.

It should however be noted that it is improbable that the blocks bMb and eMb have very different motions.

This because very different motions would represent an abrupt change in motion and image.

Should the angle alpha be greater than the threshold value delta, the temporal error concealment therefore risks giving a poor-quality result and a spatial error concealment such as the one of step 711 will be preferred to it.

On the other hand, when the angle alpha is less than the threshold value delta, it will be possible to make a comparison of the norm of each of the motion vectors of the blocks eMb and bMb.

If the norms obtained for each of the vectors supply comparable values, this means that the motion vectors are consistent with each other and then step 713 is executed.

During this step the error concealment of the corrupted macroblock bMb will be carried out, replacing it with the zone of the reference image pointed to by the motion vector evaluated at step 701.

Should the values obtained for the norms of the motion vectors of the macroblocks eMb and bMb not be comparable, then the known spatial error concealment provided for by step 711 will be carried out.

The similarity of the motion vectors of the macroblocks eMb and bMb can also be assessed, in certain circumstances, by taking account of the coding mode of the eMb macroblock.

Thus, if this coding mode is intra or intra_BL, it is possible to consider that the encoder has not applied the temporal prediction to the macroblock bMb.

This is because generally an encoder proceeds with the encoding of an Intra macroblock when no macroblock of the reference image makes it possible to predict this macroblock with a sufficiently low prediction error.

In these circumstances, there is therefore little chance that a temporal error concealment method will supply good results.

The motion vectors estimated during the error concealment can therefore only point to a poor predictor for the lost macroblock.

The motion vectors compared at step 709 are therefore not similar. Thus, in such a case, an intra-level spatial error concealment will be carried out as provided for by the following step 711 of the algorithm.

It should be noted that criteria other than the similarity of the motion vectors can of course be taken into consideration for deciding on the most appropriate error concealment method.

In the following description, several error concealment methods will be evaluated according to the data of the available higher hierarchical level(s).

The evaluation of each of these methods will supply a confidence or efficacy coefficient (in terms of quality) that will make it possible to make a decision in order to select the most appropriate error concealment method.

Figure 5:
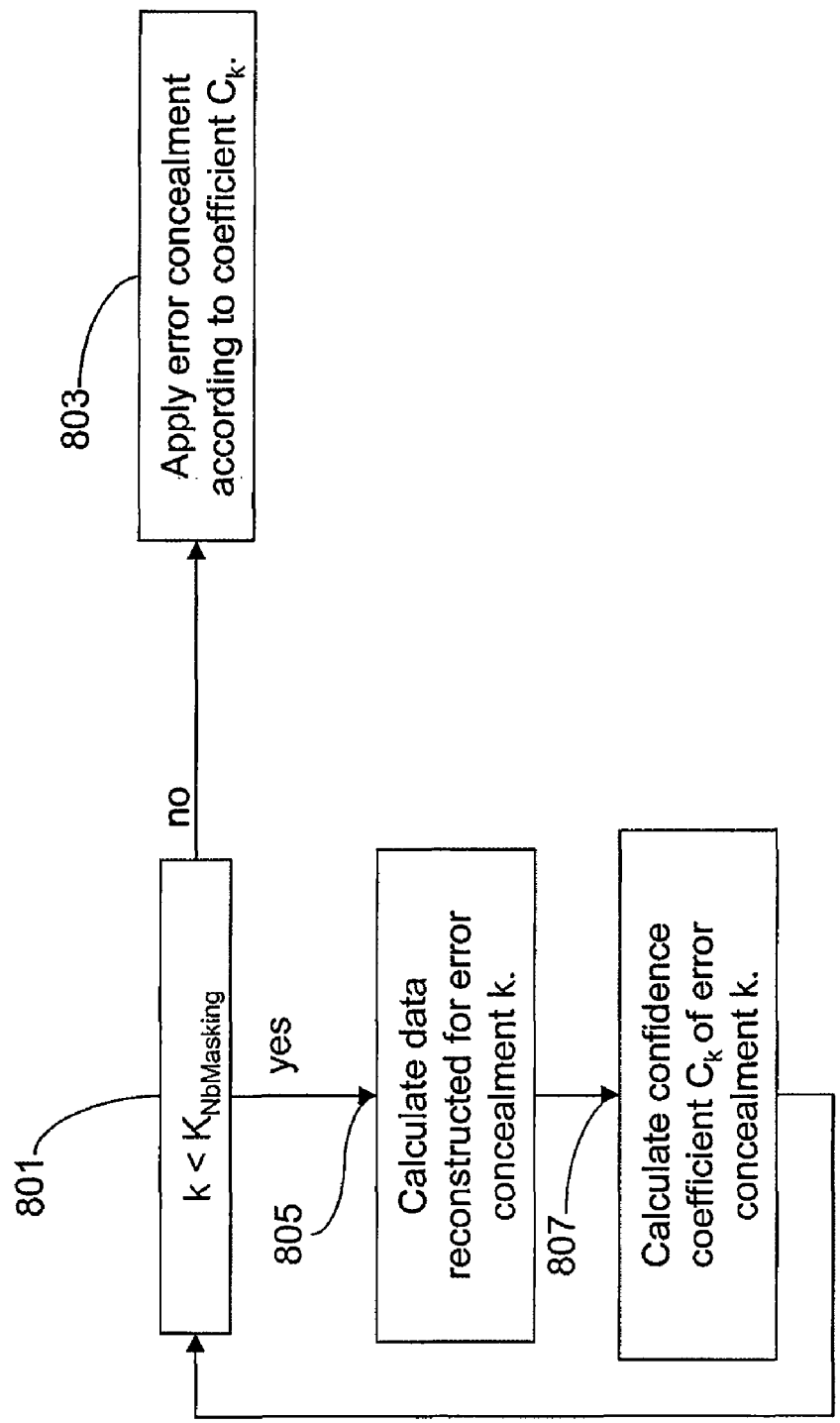
FIG. 5 is a general algorithm for determining an efficacy coefficient for the error concealment methods (second embodiment)

FIG. 5 shows an algorithm describing in general terms the principle of determining such a coefficient for each error concealment method evaluated.

This algorithm begins with a first step 801 during which it is checked whether all the error concealment methods among the $K_{NbMasking}$ error concealment methods available have been tested.

In the affirmative, the following step 803 makes provision for selecting an error concealment method according to a confidence or efficacy coefficient $C_k$ previously attributed to it.

On the other hand, when certain error concealment methods have not yet been evaluated, then the following step 805 of the algorithm calculates, for a given error concealment method k, the data reconstructed with this method.

During the following step 807 a confidence or efficacy coefficient $C_k$ of the error concealment k in question is determined.

This coefficient represents an evaluation of the error concealment method k with respect to a predetermined criterion which, here, proves to be quality.

It should be noted that quality means the visual quality of an image and this quality is assessed by comparing an original image with an image reconstituted by error concealment. This could also be an objective measurement of the quality such as a measurement of the signal to noise ratio (designated by the acronym PSNR signifying "Peak Signal to Noise Ratio").

Figure 6:
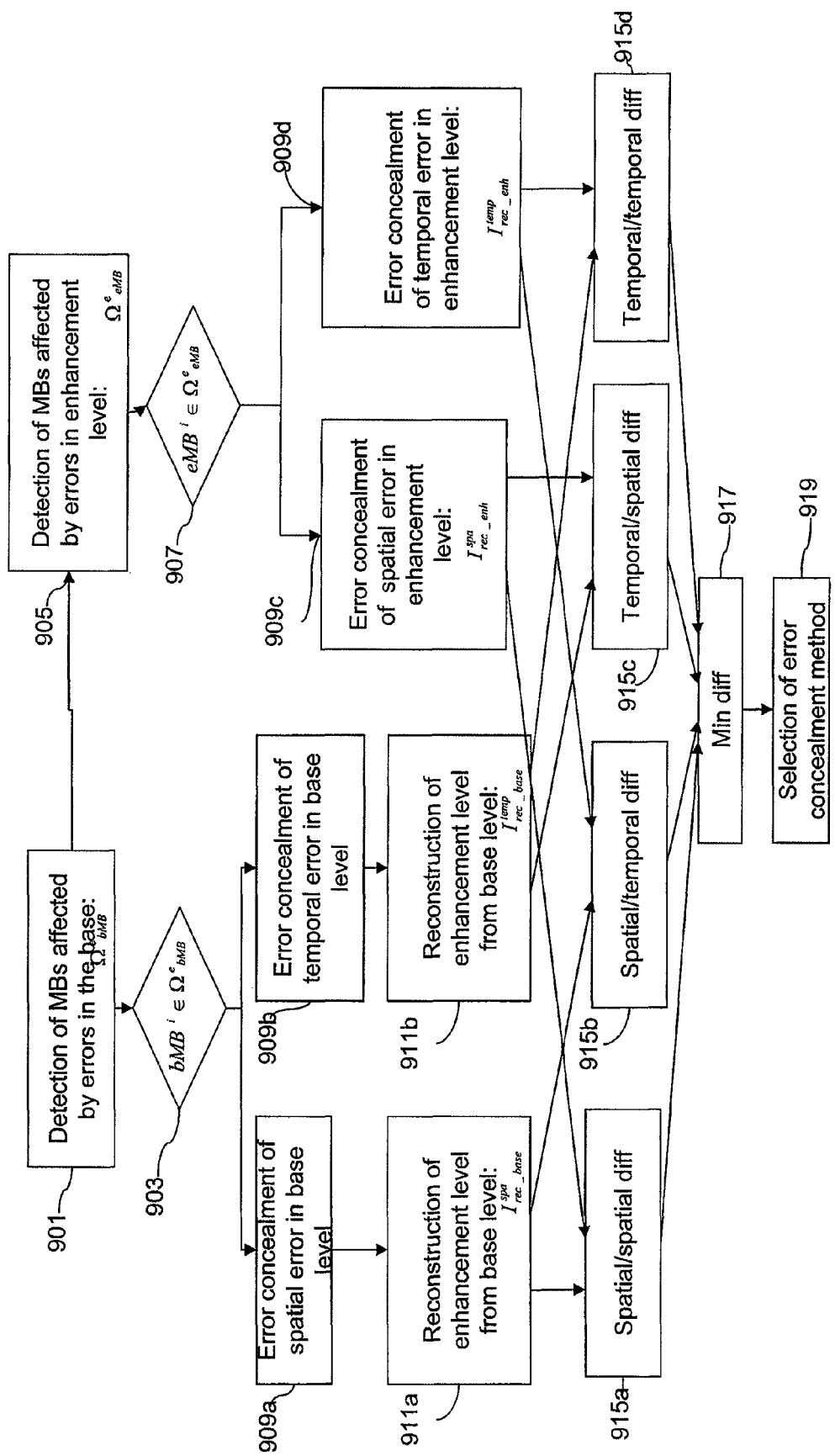
FIG. 6 is an algorithm for selecting a masking method from the determination of an efficacy coefficient for several error concealment methods.

FIG. 6 is an algorithm showing a first example of implementation of the principle disclosed in the algorithm in FIG. 5 for selecting an error concealment method from the production of coefficients characterizing the efficacy of several error concealment methods.

The algorithm in FIG. 6 begins with a first step 901 of identifying or detecting lost data macroblocks in a given hierarchical level.

The hierarchical level in question will hereinafter be referred to as the lower hierarchical level.

At the following step 903, each of the macroblocks affected by errors is selected before undergoing a particular processing, which will be described.

In parallel, during step 905, the corrupted data macroblocks (lost or erroneous) are identified or detected in the so-called higher hierarchical level.

Thus it is considered that all the macroblocks that point to a lost reference are in their turn considered to be lost for the hierarchical level in question.

The following step 907 selects in turn each of the macroblocks identified and detected at step 905 before a processing is applied to them.

Returning to step 903, each of the macroblocks affected by errors undergoes in parallel a spatial error concealment (step 909a) and a temporal error concealment (909b). Once the spatial and temporal error concealments have been applied to each of the lost macroblocks of the base level (lower level), the enhancement level (the higher hierarchical level) is reconstructed from the base level obtained by error concealment.

The following steps of the algorithm (911a and 911b) make provision respectively for reconstituting the image of the higher hierarchical level using as references respectively the two versions of the images of the lower level obtained by spatial and temporal error concealment.

In this way, at the end of the respective steps 911a and 911b two versions of the images of the higher hierarchical level are obtained, denoted $I_{rec\_base}^{spa}$ and $I_{rec\_base}^{temp}$.

In parallel to this processing, there is carried out, for each data macroblock selected at step 907, an error concealment respectively spatial and temporal in the higher hierarchical level, independently of the error concealment carried out in the lower hierarchical level.

The two steps 909c and 909d thus apply respectively to a spatial error concealment and a temporal error concealment at each macroblock in question. At the end of these steps, there are therefore obtained two versions of the images of the higher hierarchical level obtained by spatial and temporal error concealment respectively.

These image versions will serve as comparison elements in order to evaluate the quality of the spatial error concealment and temporal error concealment applied to the lower-level image.

These image versions are denoted $I_{rec\_enh}^{spa}$ and $I_{rec\_enh}^{temp}$.

A comparison is next made between each higher-level image reconstituted and each higher-level image obtained by the respective spatial and temporal error concealments.

This comparison corresponds to step 807 of the algorithm in FIG. 5, where a confidence or efficacy coefficient is determined for an error concealment method in question.

More particularly, during step 915a, which follows step 911a, the norm of the difference between the higher-level image reconstituted from a spatial error concealment of an image of a lower hierarchical level and the higher-level image obtained by a spatial error concealment at step 909c is calculated.

During step 915b, the norm of the difference between the higher-level image reconstituted at step 911a and the higher-level image obtained by temporal error concealment at step 909d is calculated.

During step 915c, the norm of the difference between the higher-level image reconstituted at step 911b and the higher-level image obtained at step 909c by spatial error concealment is calculated.

During step 915d, the norm of the difference between the higher-level image reconstituted at step 911b and the higher-level image obtained at step 909d by temporal error concealment is calculated.

This calculation of the norm of the difference between two images is expressed by the following formula:

$$\left( Diff_{a,b} = \|I^a_{rec\_base} - I^b_{rec\_enh}\| = \sum_{(x,y) \in Image} (I^a_{rec\_base}(x, y) - I^b_{rec\_enh}(x, y))^2 \right)$$

where a and b take alternately the values spa and temp and I(x, y) is a pixel of the image situated at position (x,y).

The algorithm continues with a step 917, which establishes a comparison between the four values obtained at the end of steps 915a, 915b, 915c and 915d.

The comparison of these four values makes it possible to identify a value or minimum difference between these.

The following step 919 thus makes it possible to select an error concealment method according to the result of the comparison.

More particularly, during this step, the error concealment method that was applied at the lower hierarchical level and led to the minimum difference is selected.

The version of the image of the lower hierarchical level obtained by this error concealment method is stored and possibly displayed.

Figure 7:
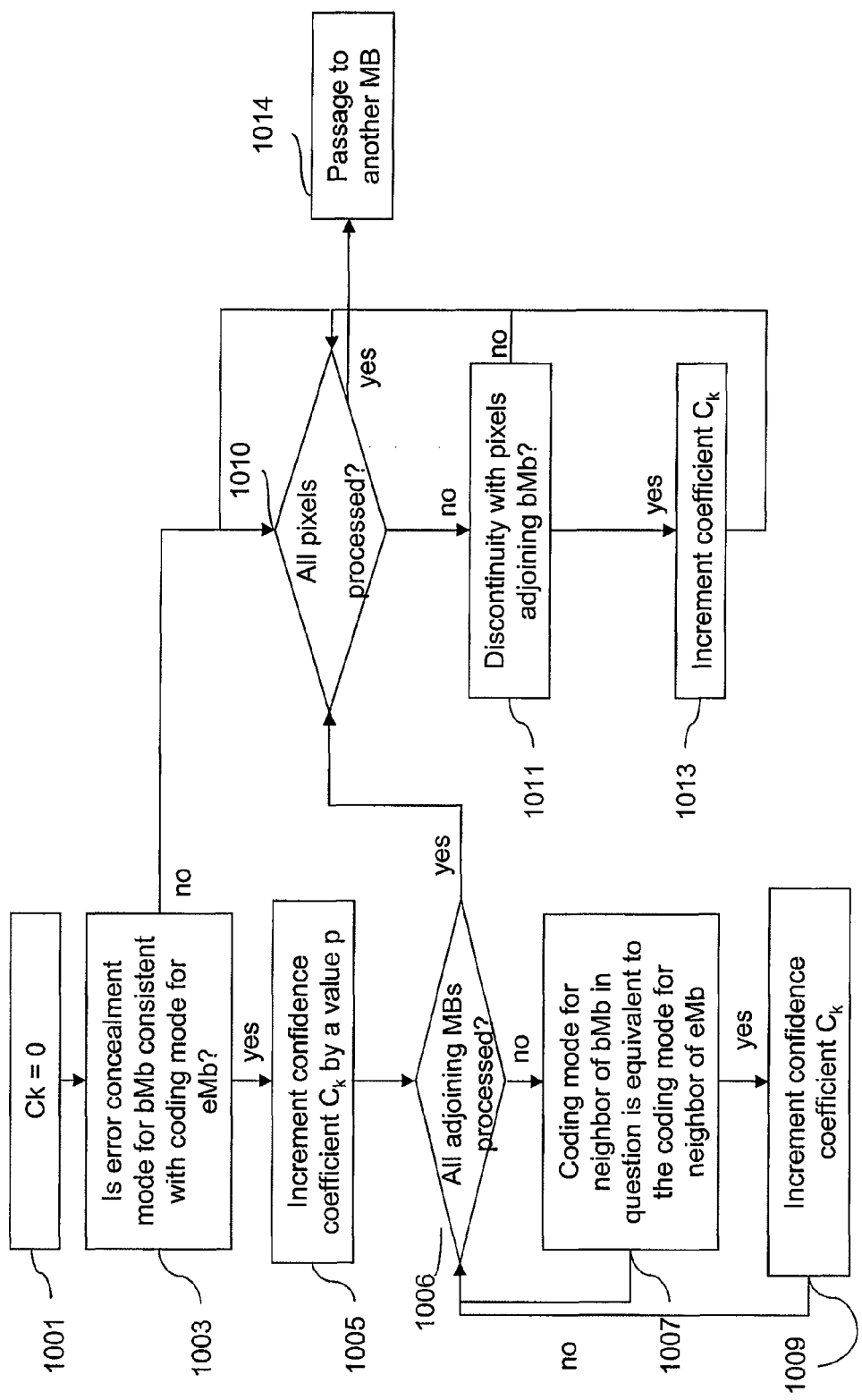
FIG. 7 is an algorithm for implementing the principle illustrated in FIG. 5.

FIG. 7 is an algorithm representing a second example of implementation of the principle illustrated in FIG. 5.

The execution of the algorithm in FIG. 7 associates a confidence or efficacy coefficient for a given error concealment method.

It should be noted that a high confidence coefficient value $C_k$ signifies that the error concealment method in question supplies a high error concealment quality.

The algorithm in FIG. 7 begins with a step 1001 of initializing the coefficient $C_k$ to the value 0.

It is assumed, in the remainder of the disclosure, that the macroblock of the higher hierarchical level, denoted eMb, corresponding to the erroneous or lost macroblock bMb of the lower hierarchical level, is available among the data received from the server.

The following step 1003 evaluates the consistency of the error concealment method in question (the error concealment method applied to the macroblock bMb) with the coding mode for the higher-level macroblock eMb.

The error concealment of the macroblock of lost data in the lower-level image may be temporal or spatial.

If the error concealment method in question is a temporal error concealment method, the erroneous macroblock bMb is predicted from a reference (macroblock in an image of the lower level) pointed to by estimated motion vectors.

If the macroblock of the higher level eMb is an Intra macroblock, then the temporal error concealment method and the coding method adopted for the macroblock eMb are inconsistent. On the other hand, if the coding mode for the macroblock of the higher level eMb is of the Inter or bidirectional type, also referred to as "Bidir", then the error concealment method and the coding mode are similar, that is to say consistent.

In the event of consistency, the value of the confidence coefficient $C_k$ is incremented by the value p at step 1005 of the algorithm. This value is greater than 1.

It should be noted that the determination of the coefficient $C_k$ can be refined by comparing the motion vectors relating to the data block eMb with the motion vectors estimated by the temporal error concealment of the erroneous data block bMb. When the motion vectors compared with each other have orientations and/or norms that are similar or, in any event, sufficiently close to each other, then the value of the coefficient $C_k$ is incremented by the value p.

If the error concealment method is a spatial error concealment method and the coding mode for the higher-level macroblock eMb is of the Inter or "Bidir" type, then it is considered that the error concealment method and the coding mode are inconsistent.

On the other hand, when the coding mode for the macroblock eMb is of the Intra type, then it is considered that the error concealment method and the coding mode are compatible and the value of the coefficient $C_k$ is incremented by the value p at step 1005 of the algorithm.

In order to refine the determination of the coefficient, a comparison is made between the orientation of the propagation of the adjoining pixels of the macroblock bMb to which the spatial error concealment method is applied and the orientation of the propagation of the Intra prediction mode of the eMb macroblock of the higher level.

When these two orientations are comparable or close to each other, the value of the coefficient is once again incremented by the value p, thus confirming the choice of this error concealment method.

In summary, during step 1003, the error concealment method and the coding mode selected respectively for the macroblocks bMb and eMb are compared.

In the case of consistency being found, it is then possible to compare the coding modes for the macroblocks adjacent to the erroneous or lost macroblock bMb with the coding modes for the macroblocks adjacent to the macroblock eMb. This is explained by the fact that there exists a strong probability for the original coding modes for the macroblocks bMb and eMb chosen by the encoder to be similar when the coding modes for the macroblocks adjoining the macroblocks bMb and eMb are similar.

More particularly, the algorithm of FIG. 7 comprises, after step 1005, a step 1006 during which it is checked whether all the macroblocks adjoining the erroneous or lost macroblock bMb have been processed by the algorithm.

If such is not the case, step 1006 is followed by step 1007.

During this step, it is checked whether the macroblock adjoining the erroneous macroblock bMb has a coding mode comparable to that of the macroblock situated at the same spatial position in the higher hierarchical level.

It should be noted that the similarity or equivalence criterion applied during step 1007 is for example the identity of the coding mode.

In the affirmative, the following step 1009 is passed to.

In the negative, the step 1006 already described is returned to.

During step 1009, the value of the confidence coefficient $C_k$ is incremented by 1 and step 1006 is returned to.

This value is less than the value p attributed at step 1003 since more importance is given to the consistency determined at step 1003 than to the equivalence between the coding modes determined at step 1007.

It should be noted that, in the case of spatial hierarchy, during the step of comparing the coding modes (step 1007), several macroblocks of the higher hierarchical level are to be considered: they are the data blocks associated in the corresponding image of a higher hierarchical level.

When no consistency is determined at step 1003 or when the comparison of the coding modes for the macroblocks adjoining the macroblocks bMb and eMb is terminated for all the adjoining macroblocks in question (step 1006), the quality of the result of the error concealment is evaluated during the following steps 1010, 1011 and 1013.

During these steps, the pixels of the erroneous or lost macroblock bMb, obtained by error concealment, are compared with the adjoining pixels.

Step 1010 is a test for checking whether all the pixels of the macroblock bMb have been processed by the algorithm.

For each pixel of the internal border of the macroblock bMb obtained by error concealment (concealed block), the continuity with the adjoining pixels of the macroblock in question are tested during the following step 1011.

In this way the consistency between the pixels of the block obtained by error concealment is determined according to the error concealment method in question and the adjoining pixels. When the relevant pixel of the concealed block does not make a contour present in the adjoining pixels disappear, nor make new contours appear, then it is considered that there is continuity between the pixel in question and the adjoining pixels.

In this case, the coefficient $C_k$ is incremented by 1 at the following step 1013. This value is less than the value p of step 1005 since the consistency determined at step 1003 has greater importance than the discontinuity measured during step 1011.

If on the other hand the pixel of the masked block has discontinuity with the adjoining pixels, then the previous step 1010 is returned to and a new pixel to be processed is tested if one remains.

At the end of step 1013, the previous step 1010 is once again executed if there are still pixels to be processed.

If the test performed at step 1010 is positive, then the following step 1014 is performed and the following block is processed.

The processing proposed by the algorithm in FIG. 7 makes it possible to evaluate the efficacy of a given error concealment method for a completely or partly lost data block in an image of a lower hierarchical level.

This efficacy is evaluated at two levels, first of all on the error concealment method itself and next on the result of the error concealment applied to the macroblock in question.

This processing makes it possible to select the error concealment method that has the greatest possibility of being effective, that is to say offering the highest quality, having regard to the data available in the higher hierarchical level or levels (enhancement layers).

It should be noted that, in the above description, the estimation of the efficacy of the error concealment method was made according to a criterion that is the visual quality or an objective measurement of the quality.

However, any criterion for estimation of the efficacy or quality of the error concealment method according to the available data of the higher hierarchical level or levels of the stream can be used.

The criterion of consistency between the pixels of the block obtained by error concealment according to the error concealment method in question and the adjoining pixels can of course be different from that present in relation to the algorithm in FIG. 7.

According to an example embodiment, the method of processing a data stream is implemented in the form a computer program or programs.

This program or programs contains one or more sequences of instructions, the execution of which by a computer or, in more general terms, by a programmable communication apparatus, enables the steps of the method to be implemented in conformity with the invention.

In general terms, an information storage means, able to be read by a computer or by microprocessor, integrated or not in this computer, and possibly removable, is adapted to store a program able to implement this method in conformity with the invention.

Figure 8:
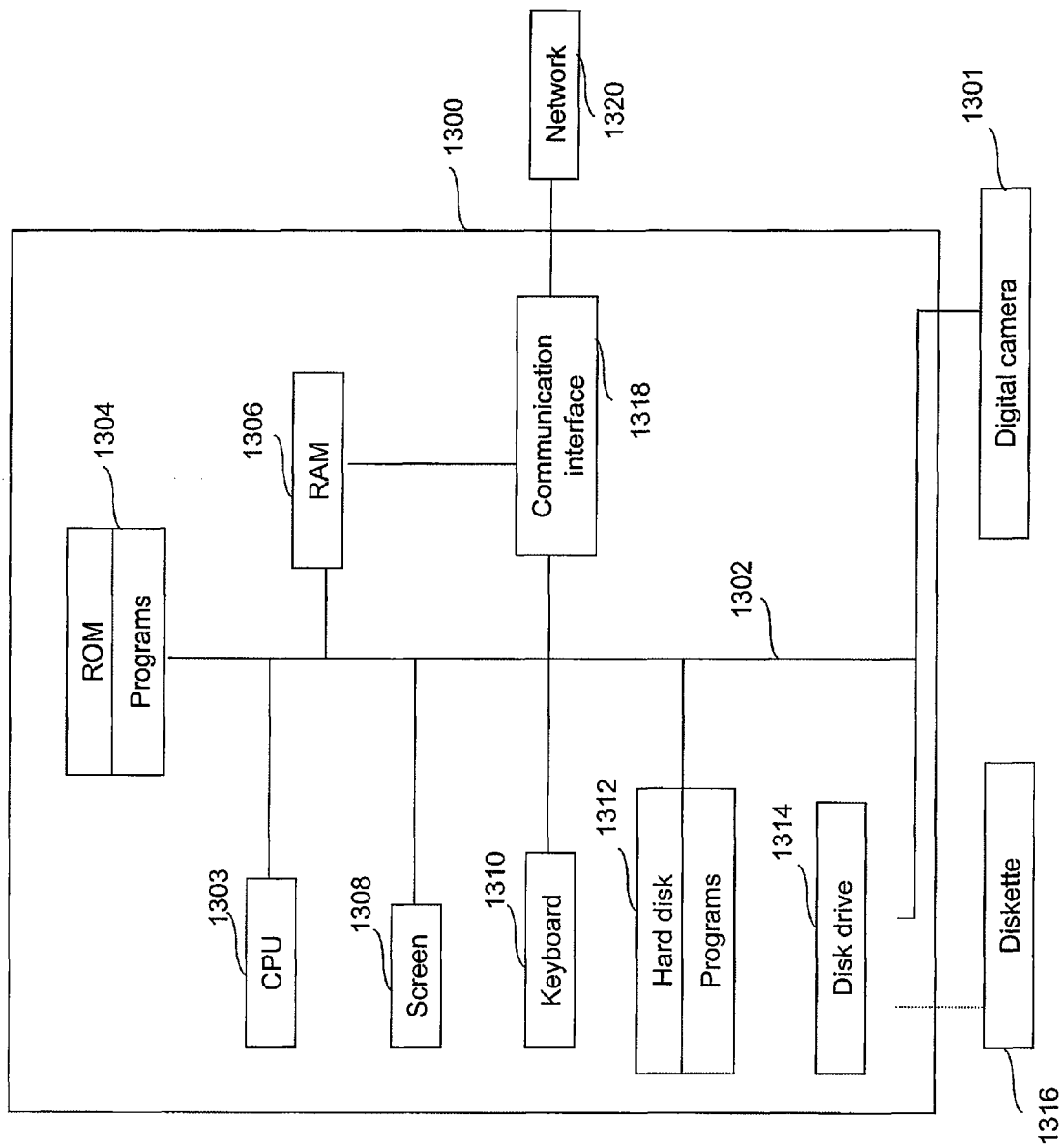
FIG. 8 is a general schematic view of a device for implementing the method according to the invention.

In FIG. 8, the computer or communication apparatus 1300, which may be a microcomputer or workstation, is connected to various peripherals, for example a digital camera 1301 for capturing the video or any other image acquisition or storage device, such as a scanner, supplying to the computer videos to be transmitted. These videos can be stored in the storage means available to the computer.

It should be noted that the reception and decoding system of FIG. 1 is for example integrated in this apparatus 1300.

The computer 1300 also comprises a communication interface 1318 that is connected to a communication system 1320, for example the internet, which is able to transmit and receive digital data.

The computer 1300 also comprises data storage means such as a hard disk 1312, a disk drive 1314 for writing data on a diskette 1316 and reading this data. The computer can also comprise a compact disk drive (CD-ROM or DVD-ROM), not shown, on which the videos can be stored, as well as a computer card (PC-CARD) reader, not shown.

The executable codes of the program or programs for implementing the various parts of the invention are for example stored on the hard disk 1312.

According to a variant embodiment, the executable codes of these programs are stored in a ROM memory (Ready Only Memory) 1304 of the computer.

The computer 1300 also comprises a screen 1308 for displaying the videos and a pointing device (not shown), such as a mouse or optical pen, and/or a keyboard 1310 so as to be able to interact with the program.

The computer comprises a central processing unit (CPU) 1303, for example a microprocessor, which controls and directs the execution of the instructions of the program or programs of the invention stored in the ROM memory 304 or on the hard disk 1312.

The computer 1300 also comprises a RAM memory (Random Access Memory) 1306.

The latter comprises registers for storing the variables created and modified during the execution of the program or programs according to the invention, in particular the variables mentioned above in the disclosure, in relation to FIGS. 2 to 7.

The programmable communication apparatus 1300 (server) comprises all the means necessary for implementing the invention for processing data (for example video), decoding data, displaying data (for example video), etc.

The invention claimed is:

1. Method of processing a multimedia data stream coded according to a plurality of hierarchical levels and transmitted over a communication network with transmission losses, the hierarchy levels being ordered so that a higher hierarchy level is coded in a way that is dependent on at least one lower hierarchy level, at least one portion of multimedia data of a lower hierarchy level having suffered transmission losses, the method comprising:
   a step of error concealment for concealing errors due to transmission losses in the at least one portion of data that has suffered transmission losses;
   a processing step applied to the error concealment in the at least one portion of data of the lower hierarchy level and involving data of at least one higher hierarchy level dependent on the lower hierarchy level;
   selecting an error concealment method between a temporal error concealment and a spatial error concealment, the selection being made according to the available data of a higher hierarchical level or levels and a predetermined criterion; and
   a step of determining the consistency of an error concealment method with the available data of a higher hierarchical level or levels.

2. Method according to claim 1, wherein the multimedia data stream is a video stream and the portions of data of the ordered hierarchy levels are images.

3. Method according to claim 2, wherein lost data of the image comprises a data block (bMb), and the method further comprises a step of seeking associated block or blocks (eMb) in the corresponding higher-level image.

4. Method according to claim 3, further comprising a verification step, in order to check whether the coding modes for the block or blocks (eMb) supply sufficient data for carrying out the error concealment of the block (bMb).

5. Method according to claim 4, wherein, in the case of positive verification, the method further comprises a step of error concealment of the block (bMb) according to the result of the decoding of the block or blocks (eMb).

6. Method according to claim 2, wherein the lost data of the image comprises a block (bMb), and the step of determining the consistency of an error concealment method with the available data of a higher hierarchical level or levels comprises:
   determining the consistency between one or more estimated motion vectors of the block of lost data (bMb) and one or more motion vectors of the associated block or blocks in the corresponding higher-level image, and
   according to the result of the determination, selecting an error concealment method between a temporal error concealment and a spatial error concealment.

7. Method according to claim 2, wherein the lost data of the image comprises a block (bMb), and the step of determining the consistency of an error concealment method with the available data of a higher hierarchical level or levels comprises the following steps:
   spatial error concealment and temporal error concealment of the blocks of lost data in the lower-level image and then reconstitution of two higher-level images from the two lower-level images obtained by the respective error concealments,
   respective spatial error concealment and temporal error concealment of the blocks of lost data in the corresponding higher-level image,
   comparison between each higher-level image reconstituted and each higher-level image obtained by the respective error concealments, and
   selection of an error concealment method according to the comparison.

8. Method according to claim 1, wherein the processing step comprises using the data of the at least one higher hierarchy level for error concealment in the at least one portion of data of the lower hierarchy level.

9. Method according to claim 1, wherein the processing step comprises using the data of the at least one higher hierarchy level in order to verify the efficacy of the error concealment step performed in the at least one portion of data of the lower hierarchy level.

10. Method according to claim 9, further comprising a step of determining an efficacy coefficient for each of the error concealment methods among a plurality of error concealment methods according to the available data of a higher hierarchical level or levels.

11. Method according to claim 1, wherein the determination of the consistency is made between the method of error concealment of a block of lost data in the lower-level image and the coding mode for the associated block or blocks of data in the corresponding higher-level image.

12. Method according to claim 11, wherein, in the case of consistency, the method further comprises a step of comparing the coding mode for the received blocks adjacent to the lost block with the coding mode for the block or blocks of data associated in the corresponding higher-level image.

13. Method according to claim 12, further comprising a step of determining the consistency between the pixels of the block obtained by error concealment according to the error concealment method in question and the adjoining pixels.

14. A non-transitory computer readable storage medium able to be read by a computer or a microprocessor containing code instructions of a computer program for executing the steps of the method according to claim 1.

15. Device for processing a multimedia data stream coded according to a plurality of hierarchical levels and transmitted over a communication network with transmission losses, the hierarchy levels being ordered so that a higher hierarchy level is coded in a way that is dependent on at least one lower hierarchy level, at least one portion of multimedia data of a lower hierarchy level having suffered transmission losses, the device comprising:
   means of error concealment for concealing errors due to transmission losses in the at least one portion of data having suffered transmission losses;
   processing means applied to the error concealment in the at least one portion of data of the lower hierarchy level and involving data of at least one higher hierarchy level dependent on the lower hierarchy level;
   selection means for selecting an error concealment method between a temporal error concealment and a spatial error concealment, the selection being made according to the available data of a higher hierarchical level or levels and a predetermined criterion; and
   determining means for determining the consistency of an error concealment method with the available data of a higher hierarchical level or levels.

16. Device according to claim 15, wherein the multimedia data stream is a video stream and the portions of data of the ordered hierarchy levels are images.

17. Device according to claim 15, wherein the processing means use data of the at least one higher hierarchy level for concealing errors in the at least one portion of data of the lower hierarchy level.

18. Device according to claim 15, wherein the processing means use data of the at least one higher hierarchy level for verifying the efficacy of the error concealment performed in the at least one portion of data of the lower hierarchy level.

* * * * *